United States Patent
Yao et al.

(10) Patent No.: US 11,206,828 B2
(45) Date of Patent: Dec. 28, 2021

(54) SYNERGISTIC MIXTURES FOR FUNGAL CONTROLS IN CEREALS

(71) Applicant: Corteva Agriscience LLC, Indianapolis, IN (US)

(72) Inventors: Chenglin Yao, Westfield, IN (US); John T Mathieson, Indianapolis, IN (US)

(73) Assignee: Corteva Agriscience LLC, Indianapolis, IN (US)

( * ) Notice: Subject to any disclaimer, the term of this patent is extended or adjusted under 35 U.S.C. 154(b) by 0 days.

(21) Appl. No.: 16/610,119

(22) PCT Filed: May 2, 2018

(86) PCT No.: PCT/US2018/030559
§ 371 (c)(1),
(2) Date: Nov. 1, 2019

(87) PCT Pub. No.: WO2018/204436
PCT Pub. Date: Nov. 8, 2018

(65) Prior Publication Data
US 2020/0085048 A1 Mar. 19, 2020

Related U.S. Application Data

(60) Provisional application No. 62/500,199, filed on May 2, 2017.

(51) Int. Cl.
*C07C 229/08* (2006.01)
*A01N 43/40* (2006.01)
*A01N 43/54* (2006.01)
*A01N 43/56* (2006.01)
*A01N 43/653* (2006.01)

(52) U.S. Cl.
CPC ............. *A01N 43/40* (2013.01); *A01N 43/54* (2013.01); *A01N 43/56* (2013.01); *A01N 43/653* (2013.01)

(58) Field of Classification Search
CPC ........ A01N 43/40; A01N 43/54; A01N 43/56; A01N 43/653
See application file for complete search history.

(56) References Cited

U.S. PATENT DOCUMENTS

| | | | |
|---|---|---|---|
| 4,051,173 A | 9/1977 | Schacht | |
| 4,588,735 A | 5/1986 | Spatz | |
| 5,342,835 A | 8/1994 | Pepin et al. | |
| 5,401,871 A | 3/1995 | Talley | |
| 5,475,132 A | 12/1995 | Pepin et al. | |
| 5,563,165 A | 10/1996 | Talley | |
| 5,760,068 A | 6/1998 | Talley et al. | |
| 5,852,042 A | 12/1998 | Jakobi | |
| 6,355,660 B1 | 3/2002 | Ricks | |
| 6,410,572 B1 | 6/2002 | Schelberger | |
| 6,436,421 B1 | 8/2002 | Schindler | |
| 6,521,622 B1 | 2/2003 | Ricks | |
| 6,706,740 B2 | 3/2004 | Ricks | |
| 6,812,237 B2 | 11/2004 | Cowen et al. | |
| 6,812,238 B1 | 11/2004 | Fukuda et al. | |
| 6,861,390 B2 | 3/2005 | Meyer | |
| 6,903,219 B2 | 6/2005 | Niyaz | |
| 6,916,932 B2 | 7/2005 | Meyer | |
| 6,927,225 B2 | 8/2005 | Ricks | |
| 6,953,807 B2 | 10/2005 | Hutin et al. | |
| 7,034,035 B2 | 4/2006 | Ricks | |
| 7,183,278 B1 | 2/2007 | Imamura | |

(Continued)

FOREIGN PATENT DOCUMENTS

| CL | 2015001862 | 10/2015 |
|---|---|---|
| CN | 101530104 | 9/2009 |

(Continued)

OTHER PUBLICATIONS

Gaylor, J. L.,"Membrane-bound enzymes of cholesterol synthesis from lanosterol." Biochemical and biophysical research communications 292.5 (2002): 1139-1146.*
Anonymous, Synergistic Fungicidal Composition of Heterocyclic Aromatic Amides and Triazoles, ip.com Journal, ip.com, Electronic Publication, West Henrietta, NY, US, Jul. 2004, 11 pages.
Backman, P., Fungicide Formulation: Relationship to Biological Activity, Ann. Rev. Phytopathol, 1978, 16, pp. 211-237.
BASF New Fungicide Xemium Got Full Approval in EU, Agronews, Jul. 18, 2012 [retrieved on Feb. 4, 2014]. Retrieved from the Internet: ,URL:http://news.agropages.com/News/NewsDetail---7386. htm, 1 page.

(Continued)

*Primary Examiner* — John M Mauro

(57) ABSTRACT

A fungicidal composition containing a fungicidally effective amount of the compound of Formula I, (S)-1,1-bis(4-fluorophenyl)propan-2-yl (3-acetoxy-4-methoxypicolinoyl)-L-alaninate, and at least one fungicide selected from the group consisting of epoxiconazole, prothioconazole, azoxystrobin, pyraclostrobin, fluxapyroxad, benzovindiflupyr, and chlorothalonil, provides synergistic control of selected fungi.

Formula I

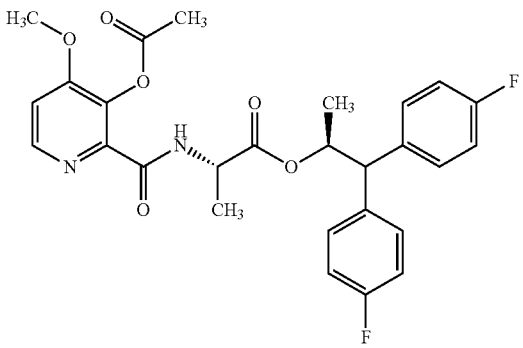

14 Claims, No Drawings

(56) References Cited

U.S. PATENT DOCUMENTS

| | | |
|---|---|---|
| 7,241,804 B1 | 7/2007 | Hockenberry |
| 7,250,389 B1 | 7/2007 | Sakanaka |
| RE39,991 E | 1/2008 | Ricks |
| 7,442,672 B2 | 12/2008 | Muller |
| 7,458,581 B1 | 12/2008 | Derrer |
| 7,560,565 B2 | 7/2009 | Bacque |
| 7,927,617 B2 | 4/2011 | Koltzenburg |
| 8,008,231 B2 | 8/2011 | Leatherman |
| 8,153,819 B2 | 4/2012 | Dietz |
| 8,236,962 B2 | 8/2012 | Hoekstra |
| 8,349,877 B2 | 1/2013 | Brix |
| 8,415,274 B2 | 4/2013 | Wachendorff-Neumann |
| 8,465,562 B2 | 6/2013 | Chen |
| 8,470,840 B2 | 6/2013 | Klittich |
| 8,476,193 B2 | 7/2013 | Keeney |
| 8,580,959 B2 | 11/2013 | Devasthale |
| 8,586,550 B2 | 11/2013 | Lee et al. |
| 8,604,215 B2 | 12/2013 | Phiasivongsa |
| 8,785,479 B2 | 7/2014 | Meyer |
| 8,835,462 B2 | 9/2014 | Meyer |
| 8,883,811 B2 | 11/2014 | Owen |
| 8,916,579 B2 | 12/2014 | Boebel |
| 9,006,259 B2 | 1/2015 | Boebel |
| 9,084,418 B2 | 7/2015 | Ehr |
| 9,131,690 B2 | 9/2015 | Meyer |
| 9,144,239 B2 | 9/2015 | Meyer |
| 9,155,305 B2 | 10/2015 | Gary |
| 9,156,816 B2 | 10/2015 | Ito |
| 9,179,674 B2 | 11/2015 | Martin |
| 9,185,911 B2 | 11/2015 | Inami |
| 9,198,419 B2 | 12/2015 | Owen |
| 9,247,741 B2 | 2/2016 | DeLorbe |
| 9,265,253 B2 | 2/2016 | Li |
| 9,265,255 B2 | 2/2016 | Funke |
| 9,271,496 B2 | 3/2016 | Kemmitt |
| 9,271,497 B2 | 3/2016 | Lorsbach |
| 9,414,596 B2 | 8/2016 | Hoekstra et al. |
| 9,439,422 B2 | 9/2016 | Martin |
| 9,482,661 B2 | 11/2016 | Ross |
| 9,549,555 B2 | 1/2017 | DeLorbe |
| 9,549,556 B2 | 1/2017 | DeKorver |
| 9,629,365 B2 | 4/2017 | Li |
| 9,681,664 B2 | 6/2017 | Lalonde |
| 9,686,984 B2 | 6/2017 | DeKorver |
| 9,700,047 B2 | 7/2017 | Lu |
| 9,750,248 B2 | 9/2017 | Ouimette |
| 9,828,408 B2 | 11/2017 | Kalayanov et al. |
| 9,840,475 B2 | 12/2017 | Lorsbach |
| 9,936,697 B2 | 4/2018 | Hopkins |
| 9,955,690 B2 | 5/2018 | Owen |
| 9,955,691 B2 | 5/2018 | Boebel |
| 9,974,304 B2 | 5/2018 | DeKorver |
| 10,015,964 B2 | 7/2018 | Ogawa et al. |
| 10,015,966 B2 | 7/2018 | Taggi et al. |
| 2002/0119979 A1 | 8/2002 | Degenhardt |
| 2002/0177578 A1 | 11/2002 | Ricks |
| 2003/0018052 A1 | 1/2003 | Ricks |
| 2003/0022902 A1 | 1/2003 | Ricks |
| 2003/0022903 A1 | 1/2003 | Ricks |
| 2005/0239873 A1 | 10/2005 | Hockenberry |
| 2006/0167281 A1 | 7/2006 | Meijer |
| 2007/0010401 A1 | 1/2007 | Noon |
| 2007/0066629 A1 | 3/2007 | Tormo i Biasco |
| 2009/0203770 A1 | 8/2009 | Hockenberry |
| 2009/0306142 A1 | 12/2009 | Carson |
| 2010/0016163 A1 | 1/2010 | Keiper |
| 2011/0070278 A1 | 3/2011 | Lopez |
| 2011/0082162 A1 | 4/2011 | Lorsbach |
| 2012/0245031 A1 | 9/2012 | Gewehr |
| 2013/0296372 A1 | 11/2013 | Owen |
| 2014/0051678 A1 | 2/2014 | Clement-Schatlo |
| 2014/0187587 A1 | 7/2014 | Ouimette et al. |
| 2014/0357713 A1 | 12/2014 | Damaj |
| 2015/0181874 A1 | 7/2015 | Owen et al. |
| 2015/0289508 A1 | 10/2015 | Meyer |
| 2015/0322051 A1 | 11/2015 | Lu |
| 2016/0037774 A1 | 2/2016 | Schulz |
| 2016/0183526 A1 | 6/2016 | Hopkins |
| 2016/0183527 A1 | 6/2016 | Hopkins |
| 2017/0183324 A1 | 6/2017 | Li |
| 2017/0360038 A1 | 6/2017 | Yao |
| 2017/0273303 A1 | 9/2017 | DeKorver |
| 2017/0273306 A1 | 9/2017 | Lalonde |
| 2017/0290333 A1 | 10/2017 | Bravo-Altamirano |
| 2017/0295792 A1 | 10/2017 | Bravo-Altamirano |
| 2017/0369421 A1 | 12/2017 | Yao |
| 2018/0000075 A1 | 1/2018 | Bravo-Altamirano et al. |
| 2018/0000080 A1 | 1/2018 | Buchan |
| 2018/0000084 A1 | 1/2018 | Yao |
| 2018/0000085 A1 | 1/2018 | Bravo-Altamirano et al. |
| 2018/0002288 A1 | 1/2018 | Buchan |
| 2018/0002319 A1 | 1/2018 | Wilmot |
| 2018/0002320 A1 | 1/2018 | Wilmot |
| 2018/0037541 A1 | 2/2018 | Yao |

FOREIGN PATENT DOCUMENTS

| | | | |
|---|---|---|---|
| FR | 2649699 | 1/1991 | |
| JP | 19940026884 | 9/1995 | |
| JP | 1998053583 | 2/1998 | |
| JP | H10-045747 | 2/1998 | |
| WO | 1996010016 | 4/1996 | |
| WO | 199637472 | 11/1996 | |
| WO | 199741103 | 6/1997 | |
| WO | 1997019908 | 6/1997 | |
| WO | 1998018751 | 5/1998 | |
| WO | 1999011127 | 11/1999 | |
| WO | 2000076979 | 12/2000 | |
| WO | 200114339 | 3/2001 | |
| WO | 2005121069 | 12/2005 | |
| WO | 2008079387 | 7/2008 | |
| WO | 2012020777 | 8/2011 | |
| WO | 2012016989 | 2/2012 | |
| WO | 2016109301 | 12/2012 | |
| WO | 2013136275 A1 | 9/2013 | |
| WO | 2016007525 | 7/2015 | |
| WO | 2016109288 | 12/2015 | |
| WO | 2016109289 | 12/2015 | |
| WO | 2016109290 | 12/2015 | |
| WO | 2016109291 | 12/2015 | |
| WO | 2016109300 | 12/2015 | |
| WO | 2016109302 | 12/2015 | |
| WO | 2016109303 | 12/2015 | |
| WO | 2016109304 | 12/2015 | |
| WO | 2016109305 | 12/2015 | |
| WO | WO-2016122802 A1 * | 8/2016 | ........... C07D 405/12 |
| WO | WO-2016187201 A2 * | 11/2016 | ........... C07D 401/06 |
| WO | 2015005355 | 3/2017 | |
| WO | WO-2018098218 A1 * | 5/2018 | ........... A01N 43/653 |

OTHER PUBLICATIONS

Bolton, M. et al., "Wheat leaf rust caused by Puccinia triticina," Molecular Plant Pathology, vol. 9, No. 5, 2008, pp. 563-575 [online] [retrieved on Feb. 3, 2016]. Retrieved from the Internet URL: https://www.researchgate.net/profile/Melvin_Bolton/publication/23483068_Wheat_leaf_rust_caused by Puccinia_triticina/links/0046352d94b8d5f2c9000000.pdf.

Davari, M. et al. "Quantum Chemical Investigation of Intramolecular Thione-Thiol Tautomerism of 1, 2, 4-triazole-3-thione and its disubstituted derivatives," Journal of Molecular Modeling, Sep. 2009, 16(5), pp. 841-855.

Cantacuzene, D., "Optimization of the papain catalyzed esterification of amino acids by alcohols and diols," Tetrahedron 45, 3 (1989): 741-748.

FRAC Code List: Fungicides Sorted by Mode of Action (including FRAC Code numbering), Fungicide Resistance Action Committee, Dec. 2008, 10 pages.

Fungicidal Mixtures, IP.com Prior Art Database Technical Disclosure, (Jul. 5, 2005), XP055073888, DOI: http://ip.com/pdf/ipcompad/IPCOM000126160D.pdf, 12 pages.

(56) References Cited

OTHER PUBLICATIONS

Gisi, U., "Synergistic Interaction of Fungicides in Mixtures," The American Phytopathology Society, vol. 86, No. 11, 1996, pp. 1273-1279.
Guseynov et al: "Study of the reaction of aminoacetic acid with dihydric alcohols and production of epoxy esters" Chemical Problems, 2009 (1), pp. 188-190.
Hu, Z. et al., "Synthesis of Novel Analogues of Antimycin A3," Tetrahedron Letters 49 (2008), pp. 5192-5195.
Huang, C. et al., "Synergistic Interactions between Chitinase ChiCW and Fungicides Against Plant Fungal Pathogens," J. Microbiol. Biotechnol., 2008, 18(4), pp. 784-787.
Kissling, E., "Crop Protection Pipeline Value Jumps to Euro 2.4 Billion," BASF SE, Mar. 10, 2011 [retrieved on Feb. 4, 2014], Retrieved from the internet: ,URL:http://agro.basf.com/agri/AP-Internet/en/content/news_room/news/basf-crop-protection-pipeline-value, 4 pages.
Koyanagi, T. et al., "Bioisoterism in Agrochemicals," Synthesis and Chemistry of Agrochemicals IV; Baker, D. et al., ACS Symposium Series; American Chemical Society: Washington, D.C., 1995, pp. 15-24.
Latin, R., et al, "Re-Examining Fungicide Synergism for Dollar Spot Control," GCM, Jul. 2008, pp. 84-87.
Ueki, M., et al., "UK-2A, B, C, and D, Novel Antifungal Antibiotics from Streptomyces sp. 517-02 I. Fermentation, Isolation, and Biological Properties," The Journal of Antibiotics, vol. 49, No. 7, Jul. 1996, pp. 639-634.
O'Sullivan, E., et al., "Fungicide Resistance—an Increasing Problem," Proceedings of National Tillage Conference 2007, Published by Crop Research Centre, Oak Park, Carlow, Jan. 31, 2007, pp. 43-56.
Parker, J.E., et al., "Mechanism of Binding of Prothioconazole to Mycosphaerella graminicola CYP51 Differs from That of Other Azole Antifungals," Applied and Environmental Microbiology, vol. 77, No. 4, Feb. 2011, pp. 1460-1465.
PubChem: Open Chemistry Database, Substance Record for SID 74383515. Deposit Date Jun. 11, 2009 [retrieved on May 25, 2016] Retrieved from internet. <URL:https://pubchem.ncbi.nlm.nih.gov/substance/74383515#section=Top>, 5 pages.
Science for a Better Life, Bayer CropScience "Positioned for Growth", Jun. 2008, 22 pages.
Calcium Dodecyl Benzene Sulfonate, CAS 26264-06-2, (http://www.hichem.com/product/showproduct.php?id=334639) Mar. 28, 2013, 6 pages.
Tani, K. et al., "UK2A, B, C, and D, Novel Antifungal Antibiotics-from Streptomyces sp. 517-02.," The Journal of Antibiotics, vol. 55, No. 3, Mar. 2002, pp. 315-321.
The Merck Index, Twelfth Edition, S. Budavari, Ed., Merck and Co., Inc., Whitehouse Station, NJ, 1996, pp. 2220, 3666, 7937 and 7946.
Usuki, Y., et al., "Semi-synthesis and biological evaluation of analogues of UK-2A, a novel antifungal antibiotic from Streptomyces sp. 517-02," Bioorganic & Medicinal Chemistry Letters, vol. 15, No. 8, 2005, pp. 2011-2014.
Usuki, Y. et al., "UK-2A, B, C, and D, Novel Antifungal Antibiotics from Streptomyces sp. 517-02 VI (2). Structure-activity Relationships of UK-2A," Journal of Antibiotics, vol. 55, No. 6, Jun. 2002, pp. 607-610.
Webster's New World Dictionary, Second College Edition, Guralnik, D, Ed., The World Publishing Co., New York, p. 1127 (1972).
Wilson, C.L. et al. "Fruit Volatiles Inhibitory to Monilinia Fruiticola and Botrytis cinerea," 1987, Plant Disease, vol. 71, No. 4, pp. 316-319.
Goellner et al. "Phakopsora pachyrhizi, the causal agent of Asian soybean rust." Molecular Plant Pathology, vol. 11, No. 2, pp. 169-177 (2010).
Fujita T, Ed. "Quantitative structure-activity analysis and database-aided bioisosteric structural transformation procedure as methodologies of agrochemical design"; Classical and Three Dimensional QSAR in Agrochemistry, ACS Symposium Series Washington, D.C. vol. 606, pp. 13-34 (1995).
Patani et al. Bioisterism: A rational approach in drug design. Chemical Reviews, vol. 96, No. 8, pp. 3147-3176 (1996).
Kendall, S. et al. "Changes in sensitivity to DMI fungicides in Rhynchosporium secalis". Crop Protection, vol. 12, No. 5, pp. 357-362 (1993).
Cooke et al. "The effect of fungicide programmes based on epoxiconazole on the control and DMI sensitivity of Rhynchosporium secalis in winter barley." Crop Protection, vol. 23, No. 5, pp. 393-406 (2004).
Shimano et al. "Total synthesis of the antifungal dilactones UK-2A and UK-3a: The determination of their relative and absolute configurations, analog synthesis and antifungal activities". Tetrahedron, vol. 54, pp. 12745-12774 (1998).
Lippard, S. "Chemical Synthesis: The Art of Chemistry". Nature, vol. 416, p. 587 (2002).
Washburn, W.N., "Identification of a nonbasic melanin hormone receptor 1 antagonist as an antiobesity clinical candidate." Journal of medicinal chemistry 57, 18 (Aug. 28, 2014): 7509-7522.
Amiri et al. "Sensitivity of Botrytis cinerea field isolates to the novel succinate dehydrogenase inhibitors fluopyram, penthiopyrad, and fluxapuroxad". Annual Meeting of the American Phytopathological Society, Phytopathology, vol. 102 (2012).
Chitwood, D. "Nematicides". Encyclopedia of Agrochemicals (3), pp. 1104-1115, John Wiley & Sons, New York, NY, http://naldc.nal.usda.gov/download/43874/PDF (2003).
Hanafi et al. "UK2A, B, C, and D, Novel Antifungal Antibiotics from Streptomyces sp 517-02 II. Structural Elucidation." The Journal of Antibiotics, vol. 49, Issue 12, pp. 1226-1231 (1996).
Shibata et al. "UK1, A Novel Cytotoxic Metabolite from Streptomyces sp. 517-02 II. Structural Elucidation." The Journal of Antibiotics, vol. 46, Issue 7, pp. 1095-1100 (1993).
Shimano et al. "Enantioselective Total Synthesis of the Antifungal Dilactone, UK-2A: The Determination of the Relative and Absolute Configurations". Tetrahedron Letters, vol. 39, pp. 4363-4366 (1998).
Stephenson, G., et al. "Glossary of terms relating to pesticides". Pure and Applied Chemistry, vol. 78, No. 11, pp. 2075-2154, International Union of Pure and Applied Chemistry (2006).
Ueki, M., et al., "UK-1, A Novel Cytotoxic Metabolite from Streptomyces sp. 517-02 I. Taxonomy, Fermentation, Isolation, Physico-chemical and Biological Properties." The Journal of Antibiotics, vol. 46, No. 7, pp. 1089-1094 (1993).
Ueki et al. "UK-3A, A Novel Antifungal Antibiotic from Streptomyces sp. 517-02: Fermentation, Isolation, Structural Elucidation and Biological Properties". The Journal of Antibiotics, vol. 50, Issue 7, pp. 551-555 (1997).
Ueki et al. "The mode of action of UK-2A and UK-3A, Novel antifungal antibiotics from Streptomyces sp. 517-02". The Journal of Antibiotics, vol. 50, Issue 12, pp. 1052-1057 (1997).
International Searching Authority, International Search Report and Written Opinion for PCT/US14/58061 dated Dec. 15, 2014, 9 pages.
International Searching Authority, International Search Report and Written Opinion for PCT/US1458065 dated Dec. 22, 2014, 9 pages.
International Searching Authority, International Search Report and Written Opinion for PCT/US1528407 dated Aug. 5, 2015, 8 pages.
International Searching Authority, International Search Report and Written Opinion for PCT/US1539407 dated Sep. 30, 2015, 9 pages.
International Searching Authority, International Search Report and Written Opinion for PCT/US1539409 dated Oct. 5, 2015,10 pages.
International Searching Authority, International Search Report and Written Opinion for PCT/US1544383 dated Mar. 16, 2016, 11 pages.

\* cited by examiner

SYNERGISTIC MIXTURES FOR FUNGAL CONTROLS IN CEREALS

CROSS REFERENCE TO RELATED APPLICATIONS

This is a national phase entry under 35 U.S.C. § 371 of international patent application PCT/US18/030559, filed on May 2, 2018 and published in English as international patent publication WO2018204436 on Nov. 8, 2018, which claims the benefit of U.S. Provisional Patent Application Ser. No. 62/500,199 filed May 2, 2017, which is expressly incorporated by reference herein.

FIELD

This disclosure concerns a synergistic fungicidal composition containing (a) the compound of Formula I and (b) at least one fungicide selected from the group consisting of a sterol biosynthesis inhibitor, for example prothioconazole, epoxiconazole, cyproconazole, myclobutanil, metconazole, difenoconazole, tebuconazole, tetraconazole, fenbuconazole, propiconazole, fluquinconazole, flusilazole, and flutriafol; a strobilurin, for example pyraclostrobin, fluoxastrobin, azoxystrobin, trifloxystrobin, picoxystrobin, and kresoxim methyl; a succinate dehydrogenase inhibitor, for example fluxapyroxad, benzovindiflupyr, penthiopyrad, isopyrazam, bixafen, boscalid, penflufen, and fluopyram; a multi-site inhibitor, for example chlorothalonil, or other commercial fungicides to provide control of any plant fungal pathogen.

BACKGROUND AND SUMMARY

Fungicides are compounds, of natural or synthetic origin, which act to protect plants against damage caused by fungi. Current methods of agriculture rely heavily on the use of fungicides. In fact, some crops cannot be grown usefully without the use of fungicides. Using fungicides allows a grower to increase the yield and the quality of the crop, and consequently, increase the value of the crop. In most situations, the increase in value of the crop is worth at least three times the cost of the use of the fungicide.

However, no one fungicide is useful in all situations and repeated usage of a single fungicide frequently leads to the development of resistance to that and related fungicides. Consequently, research is being conducted to produce fungicides and combinations of fungicides that are safer, that have better performance, that require lower dosages, that are easier to use, and that cost less.

Synergism occurs when the activity of two or more compounds exceeds the activities of the compounds when used alone.

It is an object of this disclosure to provide synergistic compositions comprising fungicidal compounds. It is a further object of this disclosure to provide processes that use these synergistic compositions. The synergistic compositions are capable of preventing or curing, or both, diseases caused by fungi of the classes Ascomycetes and Basidiomycetes. In addition, the synergistic compositions have improved efficacy against the Ascomycete and Basidiomycete pathogens, including barley scald. In accordance with this disclosure, synergistic compositions are provided along with methods for their use.

DETAILED DESCRIPTION

The present disclosure concerns a synergistic fungicidal mixture comprising a fungicidally effective amount of (a) the compound of Formula I and (b) at least one fungicide selected from the compounds of the following groups A.1, B.1 and C.1:

A.1 Sterol biosynthesis inhibitors (SBI fungicides) selected from the following groups a), b) and c):

a) C14 demethylase inhibitors (DMI fungicides), for example prothioconazole, epoxiconazole, cyproconazole, myclobutanil, metconazole, difenoconazole, tebuconazole, tetraconazole, fenbuconazole, propiconazole, fluquinconazole, flusilazole, flutriafol and prochloraz;

b) Delta 14-reductase inhibitors, for example, fenpropimorph and aldimorph;

c) Inhibitors of 3-keto reductase such as fenhexamid;

B.1 Respiration inhibitors selected from the following groups a) and b):

a) inhibitors of complex II (SDHI fungicides, e.g. carboxamides), for example fluxapyroxad, benzovindiflupyr, penthiopyrad, isopyrazam, bixafen, boscalid, penflufen, and fluopyram;

b) inhibitors of complex III at the $Q_o$ site (e.g. strobilurins), for example pyraclostrobin, fluoxastrobin, azoxystrobin, trifloxystrobin, picoxystrobin, and kresoxim methyl;

C.1 Inhibitors with multi-site action selected from the following groups a) and b):

a) thio- and dithiocarbamates, such as mancozeb;

b) organochlorine compounds (e.g. phthalimides, sulfamides, chloronitriles) such as chlorothalonil;

or other commercial fungicides to provide control of any plant fungal pathogen.

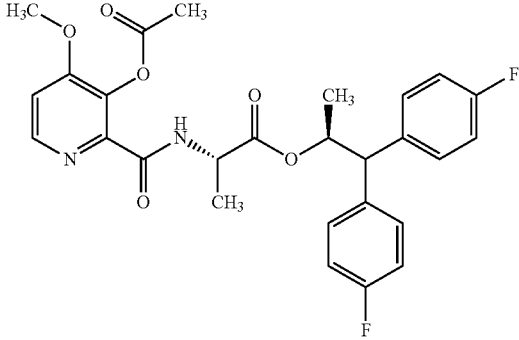

Formula I

As used herein, the compound of Formula I is (S)-1,1-bis(4-fluorophenyl)propan-2-yl (3-acetoxy-4-methoxypicolinoyl)-L-alaninate. The compound of Formula I provides control of a variety of pathogens in economically important crops including, but not limited to, the causal agent of barley scald, *Rhynchosporium secalis* (RHYNSE).

As used herein, epoxiconazole is the common name for (2RS,3SR)-1-[3-(2-chlorophenyl)-2,3-epoxy-2-(4-fluorophenyl)propyl]-1H-1,2,4-triazole and possesses the following structure:

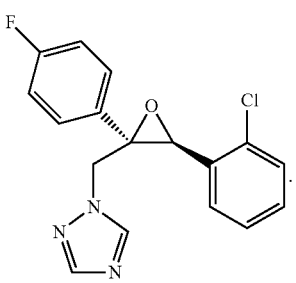 [SMILES: Fc1ccc([C@]2(Cn3cncn3)O[C@H]2c2ccccc2Cl)cc1]

Its fungicidal activity is described in *The Pesticide Manual*, Fifteenth Edition, 2009. Epoxiconazole provides broad spectrum control, with preventive and curative action, of diseases caused by Ascomycetes, Basidiomycetes and Deuteromycetes in bananas, cereals, coffee, rice and sugar beet.

As used herein, prothioconazole is the common name for 2-[(2RS)-2-(1-chlorocyclopropyl)-3-(2-chlorophenyl)-2-hydroxypropyl]-2H-1,2,4-triazole-3 (4H)-thione and possesses the following structure:

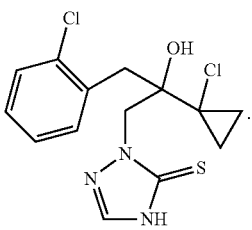 [SMILES: OC(Cc1ccccc1Cl)(Cn1nc[nH]c1=S)C1(Cl)CC1]

Its fungicidal activity is described in *The Pesticide Manual*, Fifteenth Edition, 2009. Prothioconazole provides control of diseases such as eyespot (*Pseudocercosporella herpotrichoides*), Fusarium ear blight (*Fusarium* spp., *Microdochium nivale*), leaf blotch diseases (*Zymoseptoria tritici, Parastagonospora nodorum, Pyrenophora* spp., *Rhynchosporium secalis*, etc.), rust (*Puccinia* spp.) and powdery mildew (*Blumeria graminis*), by foliar application, in wheat, barley and other crops.

As used herein, azoxystrobin is the common name for (E)-2-{2-[6-(2-cyanophenoxy)pyrimidin-4-yloxy]phenyl}-3-methoxyacrylate and possesses the following structure:

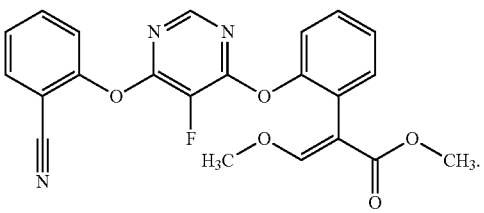 [SMILES: CO/C=C(/C(=O)OC)c1ccccc1Oc1ncnc(Oc2ccccc2C#N)c1F]

Its fungicidal activity is exemplified in *The e-Pesticide Manual*, Version 5.2, 2011. Exemplary uses of azoxystrobin include, but are not limited to, control of the following pathogens: *Erysiphe graminis, Puccinia* spp., *Parastagonospora nodorum, Zymoseptoria tritici* and *Pyrenophora teres* on temperate cereals; *Pyricularia oryzae* and *Rhizoctonia solani* on rice; *Plasmopara viticola* and *Uncinula necator* on vines; *Sphaerotheca fuliginea* and *Pseudoperonospora cubensis* on cucurbitaceae; *Phytophthora infestans* and *Alternaria solani* on potato and tomato; *Mycosphaerella arachidis, Rhizoctonia solani* and *Sclerotium rolfsii* on peanut; *Monilinia* spp. and *Cladosporium carpophilum* on peach; *Pythium* spp. and *Rhizoctonia solani* on turf; *Mycosphaerella* spp. on banana; *Cladosporium caryigenum* on pecan; *Elsinoe fawcettii, Colletotrichum* spp. and *Guignardia citricarpa* on citrus; *Colletotrichum* spp. and *Hemileia vastatrix* on coffee.

As used herein, pyraclostrobin is the common name for methyl N-[2-[[[1-(4-chlorophenyl)-1H-pyrazol-3-yl]oxy]methyl]phenyl]-N-methoxycarbamate and possesses the following structure:

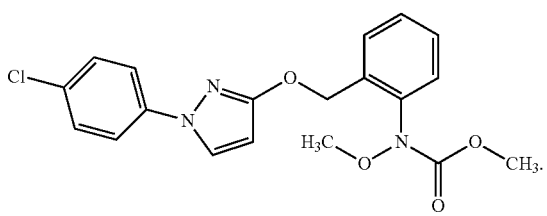 [SMILES: COC(=O)N(OC)c1ccccc1COc1ccn(-c2ccc(Cl)cc2)n1]

Its fungicidal activity is described in BCPC Online Pesticide Manual—Latest Version. Exemplary uses of pyraclostrobin include, but are not limited to, broad spectrum disease control of major plant pathogens, including *Zymoseptoria tritici, Puccinia* spp., *Drechslera tritici-repentis, Pyrenophora teres, Rhynchosporium secalis* and *Septoria nodorum* in cereals; *Mycosphaerella* spp. in peanuts; *Septoria glycines, Cercospora kikuchii* and *Phakopsora pachyrhizi* in soybeans; *Plasmopara viticola* and *Erysiphe necator* in grapes; *Phytophthora infestans* and *Alternaria solani* in potatoes and tomatoes; *Sphaerotheca fuliginea* and *Pseudoperonospora cubensis* in cucumber; *Mycosphaerella fijiensis* in bananas; *Elsinoe fawcettii* and *Guignardia* citricarpa in citrus and *Rhizoctonia solani* and *Pythium aphanidermatum* in turf.

As used herein, fluxapyroxad is the common name for 3-(difluoromethyl)-1-methyl-N-(3',4',5'-trifluorobiphenyl-2-yl)pyrazole-4-carboxamide and possesses the following structure:

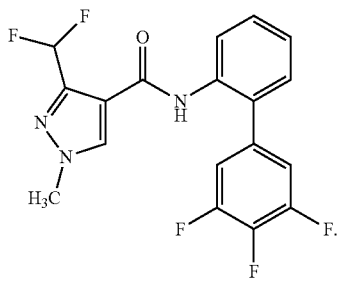

Its fungicidal activity is exemplified in Agrow Intelligence (https://www.agra-net.net/agra/agrow/databases/agrow-intelligence/). Exemplary uses of fluxapyroxad include, but are not limited to, the control of plant pathogens, such as *Helminthosporium teres* (net blotch), *Rhynchosporium secalis* (leaf scald), *Puccinia hordei* (brown rust), and *Erysiphe graminis* f. sp. *hordei* (powdery mildew) in a range of crops, such as barley, maize, and soybeans.

As used herein, benzovindiflupyr is the common name for N-[(1RS,4SR)-9-(dichloromethylene)-1,2,3,4-tetrahydro-1, 4-methanonaphthalen-5-yl]-3-(difluoromethyl)-1-methylpyrazole-4-carboxamide and possesses the following structure:

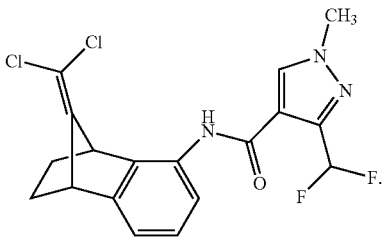 [SMILES: Cn1cc(C(=O)Nc2cccc3c2C2CCC3C2=C(Cl)Cl)c(C(F)F)n1]

Its fungicidal activity is exemplified in Agrow Intelligence (https://www.agra-net.net/agra/agrow/databases/agrow-intelligence/). Exemplary uses of benzovindiflupyr include, but are not limited to, controlling a variety of pathogens such as *Botrytis* spp., *Erysiphe* spp., *Rhizoctonia* spp., *Septoria* spp., *Phytophthora* spp., *Pythium* spp., *Phakopsora pachyrhizi*, and *Puccinia recondita*, in a range of crops including vines, cereals, soybeans, cotton, and fruit and vegetable crops.

As used herein, chlorothalonil is the common name for tetrachloroisophthalonitrile and possesses the following structure:

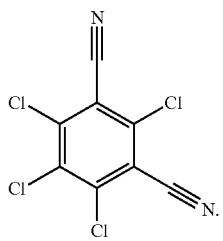 [SMILES: N#Cc1c(Cl)c(Cl)c(Cl)c(C#N)c1Cl]

Its fungicidal activity is described in *The Pesticide Manual*, Fifteenth Edition, 2009. Chlorothalonil provides control of many fungal diseases in a wide range of crops, including pome fruit, stone fruit, almonds, citrus fruit, bush and cane fruit, cranberries, strawberries, pawpaws, bananas, mangoes, coconut palms, oil palms, rubber, pepper, vines, hops, vegetables, cucurbits, tobacco, coffee, tea, rice, soya beans, peanuts, potatoes, sugar beet, cotton, maize, ornamentals, mushrooms, and turf.

In the compositions described herein, the concentration ratio of the mixture of the compound of Formula I to other fungicides at which the fungicidal effect is synergistic against barley scald caused by *Rhynchosporium secalis* (RHYNSE) in protectant applications lies within the range from about 26:1 to about 1:64.

In the compositions described herein, the concentration ratio of the mixture of the compound of Formula I to a sterol biosynthesis inhibitor at which the fungicidal effect is synergistic against RHYNSE in protectant applications lies within the range from about 16:1 to about 1:1. In one embodiment, the concentration ratio of the mixture of the compound of Formula I to epoxiconazole at which the fungicidal effect is synergistic against RHYNSE in protectant applications is about 16:1. In another embodiment, the concentration ratio of the mixture of the compound of Formula I to prothioconazole at which the fungicidal effect is synergistic against RHYNSE in protectant applications is about 1:1.

In the compositions described herein, the concentration ratio of the mixture of the compound of Formula I to a strobilurin fungicide at which the fungicidal effect is synergistic against RHYNSE in protectant applications lies within the range from about 26:1 to about 1:16. In one embodiment, the concentration ratio of the mixture of the compound of Formula I to azoxystrobin at which the fungicidal effect is synergistic against RHYNSE in protectant applications lies within the range from about 1:1 to about 1:16. In another embodiment, the concentration ratio of the mixture of the compound of Formula I to pyraclostrobin at which the fungicidal effect is synergistic against RHYNSE in protectant applications lies within the range from about 26:1 to about 1.6:1.

In the compositions described herein, the concentration ratio of the mixture of the compound of Formula I to a succinate dehydrogenase inhibitor (SDHI) fungicide at which the fungicidal effect is synergistic against RHYNSE in protectant applications lies within the range from about 26:1 to about 1:1.3. In one embodiment, the concentration ratio of the mixture of the compound of Formula I to fluxapyroxad at which the fungicidal effect is synergistic against RHYNSE in protectant applications lies within the range from about 26:1 to about 6.5:1. In another embodiment, the concentration ratio of the mixture of the compound of Formula I to benzovindiflupyr at which the fungicidal effect is synergistic against RHYNSE in protectant applications is about 1:1.3.

In the compositions described herein, the concentration ratio of the mixture of the compound of Formula I to chlorothalonil at which the fungicidal effect is synergistic against RHYNSE in protectant applications lies within the range from about 1:8 to about 1:64.

The rate at which the synergistic composition is applied will depend upon the particular type of fungus to be controlled, the degree of control required and the timing and method of application. In general, the compositions described herein can be applied at an application rate of between about 35 grams per hectare (g/ha) and about 2600 g/ha based on the total amount of active ingredients in the composition.

The compositions comprising the compound of Formula I and a sterol biosynthesis inhibitor can be applied at an application rate of between about 60 g/ha and about 350 g/ha based on the total amount of active ingredients in the composition. Epoxiconazole is applied at a rate of between about 50 g/ha and about 250 g/ha and the compound of Formula I is applied at a rate between about 10 g/ha and about 100 g/ha. Prothioconazole is applied at a rate of between about 50 g/ha and about 250 g/ha and the compound of Formula I is applied at a rate between about 10 g/ha and about 100 g/ha.

The compositions comprising the compound of Formula I and a strobilurin fungicide can be applied at an application rate of between about 60 g/ha and about 475 g/ha based on the total amount of active ingredients in the composition. Azoxystrobin is applied at a rate of between about 100 g/ha and about 375 g/ha and the compound of Formula I is applied at a rate between about 10 g/ha and about 100 g/ha. Pyraclostrobin is applied at a rate of between about 50 g/ha and about 250 g/ha and the compound of Formula I is applied at a rate between about 10 g/ha and about 100 g/ha.

The compositions comprising the compound of Formula I and a carboxamide SDHI fungicide can be applied at an application rate of between about 35 g/ha and about 400 g/ha based on the total amount of active ingredients in the composition. Fluxapyroxad is applied at a rate of between about 45 g/ha and about 200 g/ha and the compound of Formula I is applied at a rate between about 10 g/ha and about 100 g/ha. Benzovindiflupyr is applied at a rate of between about 25 g/ha and about 300 g/ha and the compound of Formula I is applied at a rate between about 10 g/ha and about 100 g/ha.

The compositions comprising the compound of Formula I and chlorothalonil can be applied at an application rate of between about 1010 g/ha and about 2600 g/ha based on the total amount of active ingredients in the composition. Chlorothalonil is applied at a rate of between about 1000 g/ha and about 2500 g/ha and the compound of Formula I is applied at a rate between about 10 g/ha and about 100 g/ha.

The components of the synergistic mixture described herein can be applied either separately or as part of a multipart fungicidal system.

The synergistic mixture of the present disclosure can be applied in conjunction with one or more other fungicides to control a wider variety of undesirable diseases. When used in conjunction with other fungicide(s), the presently claimed compounds may be formulated with the other fungicide(s), tank mixed with the other fungicide(s) or applied sequentially with the other fungicide(s). Such other fungicides may include 2-(thiocyanatomethylthio)-benzothiazole, 2-phenylphenol, 8-hydroxyquinoline sulfate, ametoctradin, amisulbrom, antimycin, *Ampelomyces quisqualis*, azaconazole, *Bacillus subtilis, Bacillus subtilis* strain QST713, benalaxyl, benomyl, benthiavalicarb-isopropyl, benzylaminobenzene-sulfonate (BABS) salt, bicarbonates, biphenyl, bismerthiazol, bitertanol, bixafen, blasticidin-S, borax, Bordeaux mixture, boscalid, bromuconazole, bupirimate, calcium polysulfide, captafol, captan, carbendazim, carboxin, carpropamid, carvone, chlazafenone, chloroneb, chlozolinate, *Coniothyrium minitans*, copper hydroxide, copper octanoate, copper oxychloride, copper sulfate, copper sulfate (tribasic), cuprous oxide, cyazofamid, cyflufenamid, cymoxanil, cyproconazole, cyprodinil, dazomet, debacarb, diammonium ethylenebis-(dithiocarbamate), dichlofluanid, dichlorophen, diclocymet, diclomezine, dichloran, diethofencarb, difenoconazole, difenzoquat ion, diflumetorim, dimethomorph, dimoxystrobin, diniconazole, diniconazole-M, dinobuton, dinocap, diphenylamine, dipymetitrone, dithianon, dodemorph, dodemorph acetate, dodine, dodine free base, edifenphos, enestrobin, enestroburin, ethaboxam, ethoxyquin, etridiazole, famoxadone, fenamidone, fenarimol, fenbuconazole, fenfuram, fenhexamid, fenoxanil, fenpiclonil, fenpropidin, fenpropimorph, fenpyrazamine, fentin, fentin acetate, fentin hydroxide, ferbam, ferimzone, fluazinam, fludioxonil, fluindapyr, flumorph, fluopicolide, fluopyram, fluoroimide, fluoxastrobin, fluquinconazole, flusilazole, flusulfamide, flutianil, flutolanil, flutriafol, folpet, formaldehyde, fosetyl, fosetyl-aluminium, fuberidazole, furalaxyl, furametpyr, guazatine, guazatine acetates, GY-81, hexachlorobenzene, hexaconazole, hymexazol, imazalil, imazalil sulfate, imibenconazole, iminoctadine, iminoctadine triacetate, iminoctadine tris(albesilate), iodocarb, ipconazole, ipfenpyrazolone, iprobenfos, iprodione, iprovalicarb, isofetamide, isoprothiolane, isopyrazam, isotianil, kasugamycin, kasugamycin hydrochloride hydrate, kresoxium-methyl, laminarin, mancopper, mancozeb, mandipropamid, maneb, mefenoxam, mepanipyrim, mepronil, meptyl-dinocap, mercuric chloride, mercuric oxide, mercurous chloride, metalaxyl, metalaxyl-M, metam, metam-ammonium, metam-potassium, metam-sodium, metconazole, methasulfocarb, methyl iodide, methyl isothiocyanate, metiram, metominostrobin, metrafenone, mildiomycin, myclobutanil, nabam, nitrothal-isopropyl, nuarimol, octhilinone, ofurace, oleic acid (fatty acids), orysastrobin, oxadixyl, oxathiapiprolin, oxine-copper, oxpoconazole fumarate, oxycarboxin, pefurazoate, penconazole, pencycuron, penflufen, pentachlorophenol, pentachlorophenyl laurate, penthiopyrad, phenylmercury acetate, phosphonic acid, phthalide, picoxystrobin, polyoxin B, polyoxins, polyoxorim, potassium bicarbonate, potassium hydroxyquinoline sulfate, probenazole, prochloraz, procymidone, propamocarb, propamocarb hydrochloride, propiconazole, propineb, proquinazid, pydiflumetofen, pyrametostrobin, pyraoxystrobin, pyraziflumid, pyrazophos, pyribencarb, pyributicarb, pyrifenox, pyrimethanil, pyriofenone, pyroquilon, quinoclamine, quinoxyfen, quintozene, *Reynoutria sachalinensis* extract, sedaxane, silthiofam, simeconazole, sodium 2-phenylphenoxide, sodium bicarbonate, sodium pentachlorophenoxide, spiroxamine, sulfur, SYP-Z048, tar oils, tebuconazole, tebufloquin, tecnazene, tetraconazole, thiabendazole, thifluzamide, thiophanate-methyl, thiram, tiadinil, tolclofos-methyl, tolylfluanid, triadimefon, triadimenol, triazoxide, tricyclazole, tridemorph, trifloxystrobin, triflumizole, triforine, triticonazole, validamycin, valifenalate, valiphenal, vinclozolin, zineb, ziram, zoxamide, *Candida oleophila, Fusarium oxysporum, Gliocladium* spp., *Phlebiopsis gigantea, Streptomyces griseoviridis, Trichoderma* spp., (RS)—N-(3,5-dichlorophenyl)-2-(methoxymethyl)-succinimide, 1,2-dichloropropane, 1,3-dichloro-1,1,3,3-tetrafluoroacetone hydrate, 1-chloro-2,4-dinitronaphthalene, 1-chloro-2-nitropropane, 2-(2-heptadecyl-2-imidazolin-1-yl)ethanol, 2,3-dihydro-5-phenyl-1,4-dithi-ine 1,1,4,4-tetraoxide, 2-methoxyethylmercury acetate, 2-methoxyethylmercury chloride, 2-methoxyethylmercury silicate, 3-(4-chlorophenyl)-5-methylrhodanine, 4-(2-nitroprop-1-enyl)phenyl thiocyanateme, aminopyrifen, ampropylfos, anilazine, azithiram, barium polysulfide, Bayer 32394, benodanil, benquinox, bentaluron, benzamacril; benzamacril-isobutyl, benzamorf, binapacryl, bis(methylmercury) sulfate, bis(tributyltin) oxide, buthiobate, cadmium calcium copper zinc chromate sulfate, carbamorph, CECA, chlobenthiazone, chloraniformethan, chlorfenazole, chlorquinox, climbazole, copper bis(3-phenylsalicylate), copper zinc chromate, cufraneb, cupric hydrazinium sulfate, cuprobam, cyclafuramid, cypendazole, cyprofuram, decafentin, dichlobentiazox, dichlone, dichlozoline, diclobutrazol, dimethirimol, dinocton, dinosulfon, dinoterbon, dipyrithione, ditalimfos, dodicin, drazoxolon, EBP, ESBP, etaconazole, etem, ethirim, fenaminosulf, fenapanil, fenitropan, fluindapyr, fluopimomide, fluotrimazole, furcarbanil, furconazole, furconazole-cis, furmecyclox, furophanate, glyodine, griseofulvin, halacrinate, Hercules 3944, hexylthiofos, ICIA0858, inpyrfluxam, ipfentrifluconazole, ipflufenoquin, isoflucypram, isopamphos, isovaledione, mandestrobin, mebenil, mecarbinzid, mefentrifluconazole, metazoxolon, methfuroxam, methylmercury dicyandiamide, metsulfovax, metyltetraprole, milneb, mucochloric anhydride, myclozolin, N-3,5-dichlorophenyl-succinimide, N-3-nitrophenylitaconimide, natamycin, N-ethylmercurio-4-toluenesulfonanilide, nickel bis(dimethyldithiocarbamate), OCH, phenylmercury dimethyldithiocarbamate, phenylmercury nitrate, phosdiphen, prothiocarb; prothiocarb hydrochloride, picarbutrazox, pydiflumetofen, pyracarbolid, pyrapropoyne, pyridachlometyl, pyridinitril, pyroxychlor, pyroxyfur, quinacetol; quinacetol sulfate, quinazamid, quinconazole, quinofumelin, rabenzazole, salicylanilide, SSF-109, sultropen, tecoram, thiadifluor, thicyofen, thiochlorfenphim, thiophanate, thioquinox, tioxymid, triamiphos, triarimol, triazbutil, trichlamide, urbacid, zarilamid, and any combinations thereof.

The compositions of the present disclosure are preferably applied in the form of a formulation comprising a composition of (a) a compound of Formula I and (b) at least one fungicide selected from the group consisting of epoxiconazole, prothioconazole, azoxystrobin, pyraclostrobin, fluxapyroxad, benzovindiflupyr, and chlorothalonil, together with a phytologically acceptable carrier.

Concentrated formulations can be dispersed in water, or another liquid, for application, or formulations can be dust-like or granular, which can then be applied without further treatment. The formulations are prepared according to procedures which are conventional in the agricultural chemical art, but which are novel and important because of the presence therein of a synergistic composition.

The formulations that are applied most often are aqueous suspensions or emulsions. Either such water-soluble, water-suspendable, or emulsifiable formulations are solids, usually known as wettable powders, or liquids, usually known as emulsifiable concentrates, aqueous suspensions, or suspension concentrates. The present disclosure contemplates all vehicles by which the synergistic compositions can be formulated for delivery and use as a fungicide.

As will be readily appreciated, any material to which these synergistic compositions can be added may be used, provided they yield the desired utility without significant interference with the activity of these synergistic compositions as antifungal agents.

Wettable powders, which may be compacted to form water-dispersible granules, comprise an intimate mixture of the synergistic composition, a carrier and agriculturally acceptable surfactants. The concentration of the synergistic composition in the wettable powder is usually from about 10% to about 90% by weight, more preferably about 25% to about 75% by weight, based on the total weight of the formulation. In the preparation of wettable powder formulations, the synergistic composition can be compounded with any of the finely divided solids, such as prophyllite, talc, chalk, gypsum, Fuller's earth, bentonite, attapulgite, starch, casein, gluten, montmorillonite clays, diatomaceous earths, purified silicates or the like. In such operations, the finely divided carrier is ground or mixed with the synergistic composition in a volatile organic solvent. Effective surfactants, comprising from about 0.5% to about 10% by weight of the wettable powder, include sulfonated lignins, naphthalenesulfonates, alkylbenzenesulfonates, alkyl sulfates, and non-ionic surfactants, such as ethylene oxide adducts of alkyl phenols.

Emulsifiable concentrates of the synergistic composition comprise a convenient concentration, such as from about 10% to about 50% by weight, in a suitable liquid, based on the total weight of the emulsifiable concentrate formulation. The components of the synergistic compositions, jointly or separately, are dissolved in a carrier, which is either a water-miscible solvent or a mixture of water-immiscible organic solvents, and emulsifiers. The concentrates may be diluted with water and oil to form spray mixtures in the form of oil-in-water emulsions. Useful organic solvents include aromatics, especially the high-boiling naphthalenic and olefinic portions of petroleum such as heavy aromatic naphtha. Other organic solvents may also be used, such as, for example, terpenic solvents, including rosin derivatives, aliphatic ketones, such as cyclohexanone, and complex alcohols, such as 2-ethoxyethanol.

Emulsifiers which can be advantageously employed herein can be readily determined by those skilled in the art and include various nonionic, anionic, cationic and amphoteric emulsifiers, or a blend of two or more emulsifiers. Examples of nonionic emulsifiers useful in preparing the emulsifiable concentrates include the polyalkylene glycol ethers and condensation products of alkyl and aryl phenols, aliphatic alcohols, aliphatic amines or fatty acids with ethylene oxide, propylene oxides such as the ethoxylated alkyl phenols and carboxylic esters solubilized with the polyol or polyoxyalkylene. Cationic emulsifiers include quaternary ammonium compounds and fatty amine salts. Anionic emulsifiers include the oil-soluble salts (e.g., calcium) of alkylaryl sulfonic acids, oil-soluble salts or sulfated polyglycol ethers and appropriate salts of phosphated polyglycol ether.

Representative organic liquids which can be employed in preparing the emulsifiable concentrates of the present disclosure are the aromatic liquids such as xylene, propyl benzene fractions, or mixed naphthalene fractions, mineral oils, substituted aromatic organic liquids such as dioctyl phthalate, kerosene, dialkyl amides of various fatty acids, particularly the dimethyl amides of fatty glycols and glycol derivatives such as the n-butyl ether, ethyl ether or methyl ether of diethylene glycol, and the methyl ether of triethylene glycol. Mixtures of two or more organic liquids are also often suitably employed in the preparation of the emulsifiable concentrate. The preferred organic liquids are xylene, and propyl benzene fractions, with xylene being most preferred. The surface-active dispersing agents are usually employed in liquid formulations and in the amount of from 0.1 to 20 percent by weight of the combined weight of the dispersing agent with the synergistic compositions. The formulations can also contain other compatible additives, for example, plant growth regulators and other biologically active compounds used in agriculture.

Aqueous suspensions comprise suspensions of one or more water-insoluble compounds, dispersed in an aqueous vehicle at a concentration in the range from about 5% to about 70% by weight, based on the total weight of the aqueous suspension formulation. Suspensions are prepared by finely grinding the components of the synergistic combination either together or separately, and vigorously mixing the ground material into a vehicle comprised of water and surfactants chosen from the same types discussed above. Other ingredients, such as inorganic salts and synthetic or natural gums, may also be added to increase the density and viscosity of the aqueous vehicle. It is often most effective to grind and mix at the same time by preparing the aqueous mixture and homogenizing it in an implement such as a sand mill, ball mill, or piston-type homogenizer.

The synergistic composition may also be applied as a granular formulation, which is particularly useful for applications to the soil. Granular formulations usually contain from about 0.5% to about 10% by weight of the compounds, based on the total weight of the granular formulation, dispersed in a carrier which consists entirely or in large part of coarsely divided attapulgite, bentonite, diatomite, clay or a similar inexpensive substance. Such formulations are usually prepared by dissolving the synergistic composition in a suitable solvent and applying it to a granular carrier which has been preformed to the appropriate particle size, in the range of from about 0.5 to about 3 millimeters (mm). Such formulations may also be prepared by making a dough or paste of the carrier and the synergistic composition, and crushing and drying to obtain the desired granular particle.

Dusts containing the synergistic composition are prepared simply by intimately mixing the synergistic composition in powdered form with a suitable dusty agricultural carrier, such as, for example, kaolin clay, ground volcanic rock, and the like. Dusts can suitably contain from about 1% to about 10% by weight of the synergistic composition/carrier combination.

The formulations may contain agriculturally acceptable adjuvant surfactants to enhance deposition, wetting and penetration of the synergistic composition onto the target crop and organism. These adjuvant surfactants may optionally be employed as a component of the formulation or as a tank mix. The amount of adjuvant surfactant will vary from 0.01 percent to 1.0 percent volume/volume (v/v) based on a spray-volume of water, preferably 0.05 to 0.5 percent. Suitable adjuvant surfactants include ethoxylated nonyl phenols, ethoxylated synthetic or natural alcohols, salts of the esters or sulfosuccinic acids, ethoxylated organosilicones, ethoxylated fatty amines and blends of surfactants with mineral or vegetable oils.

The formulations may optionally include combinations that can comprise at least 1% by weight of one or more of the synergistic compositions with another pesticidal compound. Such additional pesticidal compounds may be fungicides, insecticides, nematicides, miticides, arthropodicides, bactericides or combinations thereof that are compatible with the synergistic compositions of the present disclosure in the medium selected for application, and not antagonistic to the activity of the present compounds. Accordingly, in such embodiments the other pesticidal compound is employed as a supplemental toxicant for the same or for a different pesticidal use. The pesticidal compound and the synergistic composition can generally be mixed together in a weight ratio of from 1:100 to 100:1.

The present disclosure includes within its scope methods for the control or prevention of fungal attack. These methods comprise applying to the locus of the fungus, or to a locus in which the infestation is to be prevented (for example applying to wheat or barley plants), a fungicidally effective amount of the synergistic composition. The synergistic composition is suitable for treatment of various plants at fungicidal levels, while exhibiting low phytotoxicity. The synergistic composition is useful in a protectant or eradicant fashion. The synergistic composition is applied by any of a variety of known techniques, either as the synergistic composition or as a formulation comprising the synergistic composition. For example, the synergistic compositions may be applied to the roots, seeds or foliage of plants for the control of various fungi, without damaging the commercial value of the plants. The synergistic composition is applied in the form of any of the generally used formulation types, for example, as solutions, dusts, wettable powders, flowable concentrates, or emulsifiable concentrates. These materials are conveniently applied in various known fashions.

The synergistic composition has been found to have significant fungicidal effect, particularly for agricultural use. The synergistic composition is particularly effective for use with agricultural crops and horticultural plants, or with wood, paint, leather or carpet backing.

In particular, the synergistic composition is effective in controlling a variety of undesirable fungi that infect useful plant crops. The synergistic composition may be used against a variety of Ascomycete and Basidiomycete fungi, including for example the following representative fungi species: barley leaf scald (*Rhynchosporium secalis*); barley *Ramularia* leaf spot (*Ramularia collo-cygni*); barley net blotch (*Pyrenophora teres*); barley powdery mildew (*Blumeria graminis* f. sp. *hordei*); wheat powdery midlew (*Blumeria graminis* f sp. *tritici*); wheat brown rust (*Puccinia triticina*); stripe rust of wheat (*Puccinia striiformis*); leaf blotch of wheat (*Zymoseptoria tritici*); glume blotch of wheat (*Parastagonospora nodorum*); leaf spot of sugar beets (*Cercospora beticola*); leaf spot of peanut (*Mycosphaerella arachidis*); cucumber anthracnose (*Colletotrichum lagenarium*); cucumber powdery mildew (*Erysiphe cichoracearum*); watermelon stem gummy blight (*Didymella bryoniae*); apple scab (*Venturia inaequalis*); apple powdery mildew (*Podosphaera leucotricha*); grey mold (*Botrytis cinerea*); *Sclerotinia* white mold (*Sclerotinia sclerotiorum*); grape powdery mildew (*Erysiphe necator*); early blight of tomato (*Alternaria solani*); rice blast (*Pyricularia oryzae*); brown rot of stone fruits (*Monilinia fucticola*) and black sigatoka disease of banana (*Mycosphaerella fijiensis*). It will be understood by those in the art that the efficacy of the synergistic compositions for one or more of the foregoing fungi establishes the general utility of the synergistic compositions as fungicides.

The synergistic compositions have a broad range of efficacy as a fungicide. The exact amount of the synergistic composition to be applied is dependent not only on the relative amounts of the components, but also on the particular action desired, the fungal species to be controlled, and the stage of growth thereof, as well as the part of the plant or other product to be contacted with the synergistic composition. Thus, formulations containing the synergistic composition may not be equally effective at similar concentrations or against the same fungal species.

The synergistic compositions are effective in use with plants in a disease-inhibiting and phytologically acceptable amount. The term "disease-inhibiting and phytologically acceptable amount" refers to an amount of the synergistic composition that kills or inhibits the plant disease for which control is desired, but is not significantly toxic to the plant. The exact concentration of synergistic composition required varies with the fungal disease to be controlled, the type of formulation employed, the method of application, the particular plant species, climate conditions, and the like.

The present compositions can be applied to fungi or their locus by the use of conventional ground sprayers, granule applicators, and by other conventional means known to those skilled in the art.

The following examples are provided for illustrative purposes and should not be construed as limitations to the disclosure.

Examples

Evaluation of Protectant Activity of Fungicide Mixtures Vs. Barley Scald (*Rhynchosporium Secalis*; Bayer Code: RHYNSE):

Barley seedlings (variety Harrington) were propagated in soil-less Metro mix, with each pot having 8 to 12 plants, and used in the test when first leaf was fully emerged. Treatments consisted of fungicide compounds epoxiconazole, prothioconazole, azoxystrobin, pyraclostrobin, benzovindiflupyr, fluxapyroxad, and chlorothalonil, either using individually or as two-way mixture with the compound of Formula I.

The compounds were tested as technical grade material formulated in acetone, and spray solutions contained 10% acetone and 100 ppm Triton X-100. Fungicide solutions were applied onto plants using an automated booth sprayer, which utilized two 6218-1/4 JAUPM spray nozzles operating at 20 pounds per square inch (psi) set at opposing angles to cover both leaf surfaces. All sprayed plants were allowed to air dry prior to further handling. Control plants were sprayed in the same manner with the solvent blank.

Test plants were inoculated with an aqueous spore suspension of *Rhyncosporium secalis* 1 day after fungicide treatments (1-day protectant test). After inoculation the plants were kept in 100% relative humidity for two days to permit spores to germinate and infect the leaf. The plants were then transferred to a greenhouse for disease to develop. When disease fully developed on untreated plants, disease severity on the first leaf of the seedlings was assessed and activity was represented by percent of leaf area free of RHYNSE infection relative to the untreated plants.

Colby's equation was used to determine the fungicidal effects expected from the mixtures. (See Colby, S. R. Calculation of the synergistic and antagonistic response of herbicide combinations. *Weeds* 1967, 15, 20-22.)

The following equation was used to calculate the expected activity of mixtures containing two active ingredients, A and B:

$$\text{Expected} = A + B - (A \times B/100)$$

and

A=observed efficacy of active component A at the same concentration as used in the mixture;

B=observed efficacy of active component B at the same concentration as used in the mixture.

Synergistic interactions between compound I and other fungicides were detected in protectant assays vs. RHYNSE (Table 1).

TABLE 1

Synergistic Interactions of the Compound of Formula I and Other Fungicides in a 1-Day Protectant (1 DP) *Rhynchosporium secalis* (RHYNSE) Assay.

| Composition | Rates (ppm)* | RHYNSE* Observed* | RHYNSE* Expected* | Synergism Factor* |
|---|---|---|---|---|
| Epoxiconazole + Compound I | 0.097 + 1.56 | 46 | 14 | 3.38 |
| Prothioconazole + Compound I | 1.56 + 1.56 | 67 | 14 | 4.92 |
| Prothioconazole + Compound I | 0.78 + 0.78 | 29 | 21 | 1.40 |
| Azoxystrobin + Compound I | 3.12 + 3.12 | 95 | 57 | 1.67 |
| Azoxystrobin + Compound I | 12.5 + 1.56 | 93 | 38 | 2.47 |
| Azoxystrobin + Compound I | 6.25 + 1.56 | 93 | 14 | 6.83 |
| Azoxystrobin + Compound I | 3.12 + 1.56 | 73 | 19 | 3.85 |
| Azoxystrobin + Compound I | 12.5 + 0.78 | 90 | 28 | 3.23 |
| Azoxystrobin + Compound I | 3.12 + 0.78 | 56 | 6 | 9.00 |
| Pyraclostrobin + Compound I | 0.48 + 3.12 | 99 | 61 | 1.64 |
| Pyraclostrobin + Compound I | 0.24 + 3.12 | 99 | 62 | 1.60 |
| Pyraclostrobin + Compound I | 0.12 + 3.12 | 96 | 54 | 1.78 |
| Pyraclostrobin + Compound I | 0.48 + 1.56 | 94 | 26 | 3.69 |
| Pyraclostrobin + Compound I | 0.24 + 1.56 | 92 | 28 | 3.28 |
| Pyraclostrobin + Compound I | 0.12 + 1.56 | 91 | 14 | 6.71 |
| Pyraclostrobin + Compound I | 0.48 + 0.78 | 80 | 14 | 5.79 |
| Pyraclostrobin + Compound I | 0.24 + 0.78 | 67 | 17 | 4.00 |
| Fluxapyroxad + Compound I | 0.12 + 3.12 | 81 | 54 | 1.50 |
| Fluxapyroxad + Compound I | 0.24 + 1.56 | 79 | 14 | 5.85 |
| Fluxapyroxad + Compound I | 0.12 + 1.56 | 29 | 14 | 2.15 |
| Benzovindiflupyr + Compound I | 2 + 1.56 | 79 | 49 | 1.62 |
| Chlorothalonil + Compound I | 25 + 3.12 | 88 | 54 | 1.62 |
| Chlorothalonil + Compound I | 50 + 1.56 | 98 | 46 | 2.12 |
| Chlorothalonil + Compound I | 25 + 1.56 | 70 | 14 | 5.17 |
| Chlorothalonil + Compound I | 12.5 + 1.56 | 25 | 14 | 1.85 |
| Chlorothalonil + Compound I | 50 + 0.78 | 81 | 38 | 2.17 |

*RHYNSE = Barley scald; *Rhynchosporium secalis*
*Observed = Observed percent disease control at the test rates
*Expected = Percent disease control expected as predicted by the Colby equation
*ppm = Parts per million
*Synergism factor = Observed/Expected

What is claimed:

1. A synergistic fungicidal mixture, comprising: a fungicidally effective amount of the compound of Formula I, (S)-1,1-bis(4-fluorophenyl)propan-2-yl (3-acetoxy-4-methoxypicolinoyl)-L-alaninate:

Formula I at least one additional fungicide selected from the group consisting of epoxiconazole, prothioconazole, azoxystrobin, pyraclostrobin, benzovindiflupyr, fluxapyroxad, and chlorothalonil.

2. The mixture of claim 1 wherein the additional fungicide is selected from the group consisting of epoxiconazole and prothioconazole.

3. The mixture of claim 2 wherein the concentration ratio of the compound of Formula I to epoxiconazole is about 16:1.

4. The mixture of claim 2 wherein the concentration ratio of the compound of Formula I to prothioconazole is about 1:1.

5. The mixture of claim 1 wherein the additional fungicide is selected from the group consisting of azoxystrobin and pyraclostrobin.

6. The mixture of claim 5 wherein the concentration ratio of the compound of Formula I to azoxystrobin is from about 1:1 to about 1:16.

7. The mixture of claim 5 wherein the concentration ratio of the compound of Formula I to pyraclostrobin is from about 26:1 to about 1.6:1.

8. The mixture of claim 1 wherein the additional fungicide is selected from the group consisting of fluxapyroxad and benzovindiflupyr.

9. The mixture of claim 8 wherein the concentration ratio of the compound of Formula I to fluxapyroxad is from about 26:1 to about 6.5:1.

10. The mixture of claim 8 wherein the concentration ratio of the compound of Formula I to benzovindiflupyr is about 1:1.3.

11. The mixture of claim 1 wherein the additional fungicide is chlorothalonil.

12. The mixture of claim 11 wherein the concentration ratio of the compound of Formula I to chlorothalonil is from about 1:8 to about 1:64.

13. The mixture of claim 1, wherein the mixture provides control of a fungal pathogen, and the pathogen is the causal agent of barley scald (*Rhynchosporium secalis*).

14. A synergistic, fungicidal composition comprising of a fungicidally effective amount of the mixture of claim 1 and an agriculturally acceptable carrier.

* * * * *